Aug. 30, 1955  M. H. FRISBIE ET AL  2,716,269
METHOD OF BUSHING FRANGIBLE BODIES TO MAKE FRACTUREPROOF
Original Filed Aug. 21, 1945
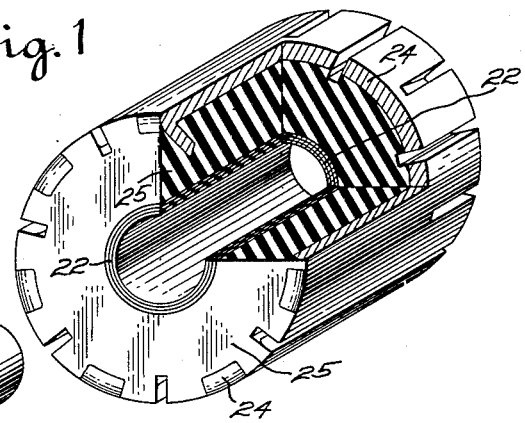
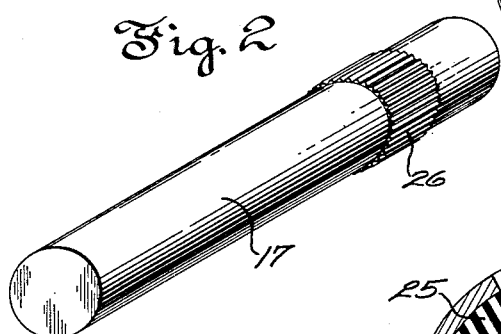
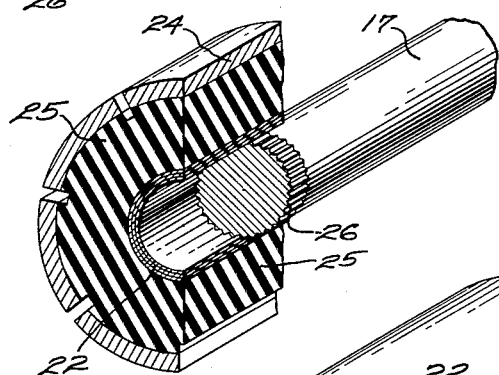
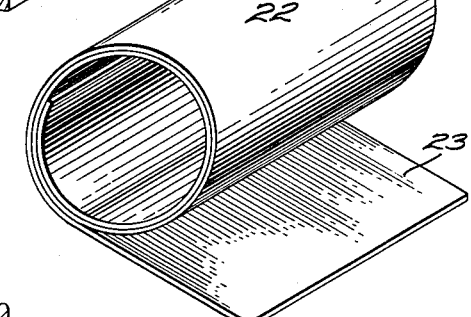
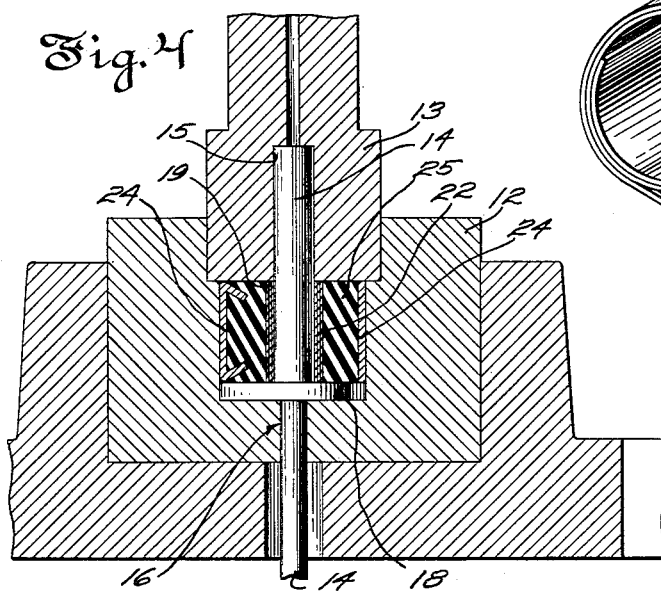
INVENTORS
Marshall H. Frisbie,
Shirley P. Morse,
BY
ATTORNEY

# United States Patent Office 2,716,269
Patented Aug. 30, 1955

2,716,269

METHOD OF BUSHING FRANGIBLE BODIES TO MAKE FRACTUREPROOF

Marshall H. Frisbie, Hamden, and Shirley P. Morse, East Haven, Conn., assignors to The A. C. Gilbert Company, New Haven, Conn., a corporation of Maryland Original application August 21, 1945, Serial No. 611,882. Divided and this application July 28, 1950, Serial No. 176,326

6 Claims. (Cl. 29—155.54)

This invention relates to methods of making frangible small rotor bodies, as for instance the molded insulative core body of a commutator for a small electric motor or the like, that shall be immune to fracture normally tending to result from forcing such a body onto a motor shaft with a press fit. The invention yields analogous advantages when practiced in the making of any body of frangible substance containing a hole or holes into which oversize plugs are to be forced with a press fit.

Attempts to press even a slightly oversize knurled metal shaft endwise with a tight fit into or through a relatively undersized hole in a small rotor body of molded condensation product, such as phenolic thermosetting compositions, urea resins, etc., occasion considerable trouble from chipping or cracking of the hard and brittle insulative body of the rotor. Exacting and costly tolerance of fits has heretofore been resorted to for relief from this condition.

A main object of these improvements is to avoid fracturing of a frangible rotor body when being mounted on its shaft by press fit telescopic assemblage and without requiring extremely precise accuracy of fit of the shaft in its hole.

A contributory object is to fabricate a hollow frangible body bushed by a lining in such manner that the lining forms a hole that will be dimensionally stable but will accommodate itself to the axially sliding fit of a somewhat oversize shaft or plug pin pressed lengthwise thereinto without transmitting to the frangible body itself any stresses capable of chipping or breaking it, the lining remaining bonded to and positively constrained by the surrounding non-yielding frangible body.

It is a further object of the invention to produce a fracture inhibiting composite rotor body by incorporating therein a lining bushing for a shaft hole and bonding such bushing to the insulative body of the rotor in the same application of heat that accomplishes the molding and permanent thermosetting of the "plastic" material of the rotor body.

It is a further object to fabricate the fracture inhibiting bushing by the building up of plural or laminated layers or convolutions.

The foregoing and other aims will appear in greater particular from the following description of an illustrative way of practicing the invention having reference to the appended drawings wherein:

Fig. 1 is a perspective view of a rotor in the form of a small motor commutator having a frangible insulative hub or core body partly broken away to explain features of the present improvement.

Fig. 2 is a corresponding perspective view of an armature shaft having a portion knurled to enlarge its outside diameter for press fit assemblage with the core body of Fig. 1.

Fig. 3 represents a strip of impregnated paper partially rolled upon itself to form the laminated wall of a fracture inhibiting bushing that is incorporated in the composite commutator core of Fig. 1 by the method of these improvements.

Fig. 4 shows a bushing formed of the impregnated roll of paper in Fig. 3 sleeved closely around a mandrel stationed centrally of a mold cavity suited to produce the commutator of Fig. 1.

Fig. 5 shows the knurled shaft and commutator in assembled relation and partially broken away.

We have found the following to be one successful way of practicing the present invention for producing a composite, plug receptive, insulative body incorporating the desired fracture inhibiting features. Preferably, we first provide a suitable mold, as for instance that described in U. S. Patent 1,578,793 granted March 30, 1926, to V. G. Apple, which, as represented in Fig. 4 hereof, may include a hollow die 12 provided with a vertically movable plunger 13 having a hole 15 slidably receiving a vertical mandrel 14 approximately of the same diameter as the unknurled portion of a motor shaft 17. Upon this shaft the finished commutator of Fig. 1 is to be mounted fixedly as shown in Fig. 5 by inserting the shaft endwise and telescopically into or through the hole in the commutator core that is produced by mandrel 14.

Mandrel 14 has fixed thereon a discal flange 18 which during the molding process fills the bottom end of the mold cavity in die 12 but rises with the mandrel in such cavity to eject the finished commutator whenever the mandrel slides upward through its guide hole 16 in die 12 after completion of the molding operation.

There is first wound upon or sleeved telescopically over mandrel 14 a hole lining in the form of bushing 22 consisting of a number of turns of very thin tough paper 23 soaked in, or otherwise impregnated with, an uncured thermosetting composition in liquid form. Paper 23 thus progressively rolled into a bushing produces a multiple-ply bushing wall composed of mutually adhering flexible convolutions, each convolution consisting of a superimposed coil of the impregnated paper 23.

In the mold cavity 19 between the outside surface of bushing 22 and the retaining wall of the mold there is then placed a preferably powdered condensation product of thermosetting composition such as a phenolic or urea resin in sufficient quantity to fill the empty space in cavity 19. In the case of a small commutator as presently illustrated the retaining wall of the mold fits a skeleton cylindrical commutator shell 24 of conductive metal which forms, at least in part, the retaining wall of the mold cavity because such shell is inserted in the mold cavity 19 in a manner to confine and become bonded to the insulative core body 25 of the commutator.

After the molding cavity has been filled with the powdered condensation product, plunger 13 is forced downward into its position shown in Fig. 4 and while in this position the mold and its entire contents are heated until the condensation product first melts to a liquid which fills and conforms to all faces of the mold cavity including bushing 22 and metallic shell 24. As is well understood in the plastic molding art the molten composition then permanently hardens or sets in its mold determined form and becomes the hard and frangible insulative core body 25 of the commutator.

During this thermosetting process the paper coils 23 of bushing 22 become bonded to each other by at least partial curing of the thermosetting substance with which they are impregnated and likewise the bushing as a whole becomes fixedly bonded to the insulative body 25 of the commutator as an embedded lining or facing for the shaft hole possessing a degree of resilience.

The mold plunger 13 can now be lifted and mandrel 14 together with the complete commutator can be withdrawn from the die, mandrel 14 preferably being free to slide relative both to the hollow die 12 and to the plunger 13.

The bushing 22 has now become in effect a unitary part of the insulative body of the commutator but retains some of the characteristics of a roll of paper. Due to these retained characteristics the bushing is found to possess sufficient compressibility and resilience to admit in telescopic manner to the commutator hole the somewhat oversize knurled portion 26 of a shaft 17 that can be comparatively larger in relation to the hole size than would be possible in the absence of such bushing. When a knurled shaft is forced endwise into a thus bushed frangible core body with a tight press fit it is found that the yielding ability of bushing 22 inhibits chipping, cracking and fracture of the hard frangible surrounding core body by which it is nevertheless positively constrained. The bushing is found to cling fixedly and dependably to the shaft so that there results a securely fixed mounting of the commutator upon its shaft by the ordinary method of telescopic press-fit assemblage.

As one example of practical sizes and relationships illustrated in the drawings, the insulative core body may be 1½" in outside diameter and the shaft hole may be approximately 3/16" in diameter lined by a coiled paper bushing of about 1/32" total thickness of laminated wall. These diameters are approximate and the assemblage will be effective with a shaft whose unknurled portion is .1865" diameter and whose knurled portion may be a minimum of .189" diameter or a maximum of .191" diameter. A suitable thermosetting liquid with which to impregnate paper 23 is phenol aldehyde or resin. The paper is fed in strip form through a resin dip and then through a drying oven which partially dries the resin. The strip thus impregnated is then wound onto a mandrel and in this condition rolled between heated rolls. A partial cure of the impregnating material takes place and a high polish of the mandrel surface permits the resulting paper bushing to be slipped off from the end of the mandrel without sticking. This paper may be .008" thick and bushing 22 may consist of a coil of four convolutions of the paper. Paper having a content of cotton rag has been found to be suitable.

Obviously the application of the principles of this invention to the making of any kind of pin or plug receiving hole in a solid body of frangible molded material will serve to protect the body from chipping and cracking when oversize pins or plugs are forced thereinto with a press fit. The same advantages will result, namely in preventing the transmission of stresses to the frangible body which otherwise could fracture it. This case is divisional from our copending application, Serial No. 611,882, filed August 21, 1945, now Patent 2,541,047 wherein is claimed structure disclosed but not claimed herein.

The appended claims are intended to cover not only the particular processes and methods herein described and illustrated as ways of practicing the invention, but are directed to all equivalents and substitutes for such processes and methods as fall fairly within the broadest interpretation of the claim language.

We claim:

1. The method of preparing a hard frangible rotor body containing a mounting hole for press fit assemblage with an oversize shaft and of effecting said assemblage without danger of fracturing said body, which includes the steps of holding together in surface to surface contact a tubular bushing of pliant compressible paper impregnated with an uncured liquid thermosetting resin and a surrounding uncured mass of powdered condensation product of thermosetting composition, applying sufficient heat simultaneously to said bushing and said mass while same are held in surface contact to bond the contacting surfaces thereof fixedly together whereby said bushing forms a relatively soft and compressible laminate lining permanently united with said hard frangible body and bordering said shaft hole, and then pressing endwise into said hole a shaft whose overall diameter sufficiently exceeds the inner diameter of said bushing to squeeze the relatively soft material of the latter radially outward against the surrounding hard surface of said frangible body thereby to produce a tight press fit in which the compressibility of said bushing sufficiently relieves said frangible body of stresses and strains to avoid fracturing the same.

2. The method defined in claim 1, together with the step of partially curing the said liquid thermoplastic composition after the paper of the said bushing is impregnated therewith and before performing the said step of applying the said bonding heat.

3. The method defined in claim 1, in which the said bushing is formed by coiling a running length of pliant paper strip about the highly polished surface of a removable mandrel.

4. The method defined in claim 1, in which the said bushing is formed by impregnating a paper strip with resin, partially drying said resin, and coiling the impregnated strip about the highly polished surface of a removable mandrel.

5. The method defined in claim 3, in which the said paper of the said strip is approximately .008" thick and has a content of cotton rag and is coiled into a sufficient number of overlapping convolutions to attain a wall thickness of approximately 1/32 inch.

6. The method defined in claim 3, in which the said thermosetting resin is a phenol aldehyde and the said condensation product is a urea resin.

References Cited in the file of this patent

UNITED STATES PATENTS

| | | |
|---|---|---|
| 1,315,365 | Hamm | Sept. 9, 1919 |
| 1,392,174 | Kempton | Sept. 27, 1921 |
| 1,401,708 | Kempton | Dec. 27, 1921 |
| 1,486,893 | Himes | Mar. 18, 1924 |
| 1,503,484 | Conkling | Aug. 5, 1924 |
| 1,578,793 | Apple | Mar. 30, 1926 |
| 1,883,736 | Cotterman | Oct. 18, 1932 |
| 2,432,819 | Schumacker | Dec. 16, 1947 |